Feb. 5, 1957 H. F. OTT ET AL 2,780,574
METHOD OF FORMING AN OPTICAL ASSEMBLY
Filed April 22, 1953
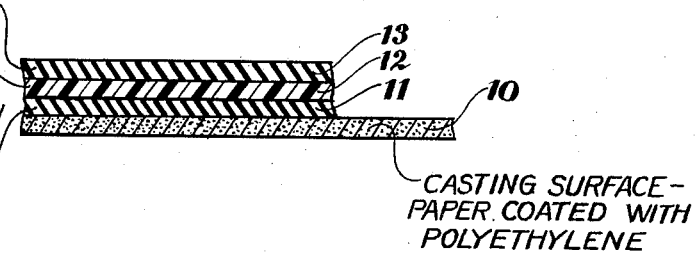
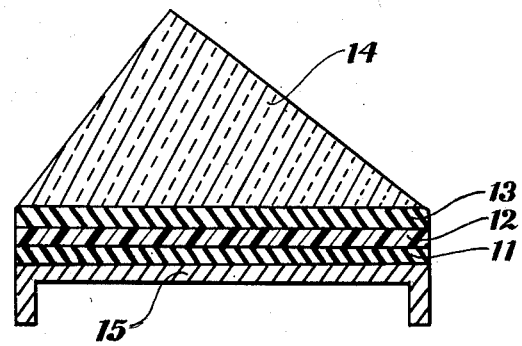
Howard F. Ott
Ezra C. Poling
INVENTORS
ATTORNEYS

2,780,574

METHOD OF FORMING AN OPTICAL ASSEMBLY

Howard F. Ott and Ezra C. Poling, Rochester, N. Y., assignors to Eastman Kodak Company, Rochester, N. Y., a corporation of New Jersey Application April 22, 1953, Serial No. 350,421

11 Claims. (Cl. 154—128)

This invention relates to an adhesive in sheet form consisting of a layer of unpolymerized, thermosetting phenolic-synthetic linear polyamide resin combination sandwiched between two layers of phenolic-neoprene elastomer. The invention also pertains to assemblies bonded by the new adhesive.

The new adhesive is particularly useful in the bonding of glass to metal, such as in the mounting of optical prisms to metal supports therefor, but it also has a wide variety of other uses such as in the attaching of glass to glass, metal to metal, and the like, and also for use with bodies of synthetic resin and the like. The new adhesive can also be used where the surfaces to be bonded are flat, curved or where portions of the bonded area lie in different planes.

In the art of attaching optical elements, for instance those having flat surfaces, such as prisms, to supports made, for example of metal, particularly where the assemblies are to be subjected to vibration and to a wide range of temperatures, such as might occur in military use, considerable difficulty has been experienced in finding a satisfactory adhesive-type mounting means. One of the types of adhesives previously suggested involved the painting on of a layer of neoprene on the two surfaces to be attached, and a similar application of an intermediate layer of a phenolic resin. However, considerable difficulty was experienced in obtaining uniformity in such bonds and the number of assemblies so made which were unable to meet the requirements for strength and long life ran so high that this type of adhesive was economically unfeasible.

It has also been proposed to attach metal to glass by means of pure phenolic coatings in contact with glass, but such mountings cannot be used for many installations because of the fact that it has been found that such contact of a phenolic resin with glass causes cracking of the glass at extremely low temperatures.

Adhesives utilizing a cloth or paper layer have also been tried, but they cannot be used in assemblies such as prism mounting where it is important that the adhesive not cause a substantially measurable separation of the prism and its support, that is, where it is important that the prism and support not be spaced appreciably more by the adhesive, after it is set, than they would be if held together by a purely mechanical clamping device. Even more important is the fact that the bonds provided by adhesives including paper or cloth layers are weaker than the bonds provided by the adhesive of the present invention. This is particularly true where the ultimate uses of the bonded assemblies are in the presence of moisture or water vapor.

We have found that a satisfactory bond, eliminating the undesirable features referred to above, and providing assemblies which meet the required tests with much greater consistency than the assemblies made heretofore, is achieved by the use of a precast adhesive in film form comprising an unsupported layer of unpolymerized thermosetting phenolic-synthetic linear polyamide resin combination of the type which fuses to a liquid form on heating, prior to assuming its set condition, sandwiched between two layers of phenolic-neoprene elastomer. Even though made so thin as to cause no appreciable spacing of the elements joined, this adhesive provides bonds of the required high strength, durability and long life far better than other comparable known adhesives. This adhesive has no layer of pure phenolic in contact with glass surfaces and thus overcomes the low temperature cracking of glass which has resulted in the past from contact of a phenolic with glass as referred to above.

The success of the new adhesive is apparently, to a great extent, due to the fact that the particular combination and arrangement of layers of neoprene-phenolic and phenolic-polyamide resins causes the neoprene containing layers to achieve a very intimate and complete contact with the entire areas of the surfaces to be joined. This strengthens the bond immensely and is of great importance in obtaining bonds which pass the required tests practically without any faulty bonds requiring rejection. The intimate and complete contact of the neoprene containing layers to the surfaces to be joined is apparently brought about by the fact that the intermediate layer of phenolic-polyamide resin composition becomes softened during the first stages of the heating which is used in the bonding operation, and becomes substantially liquid, whereby it exerts what might be called a "squeegee" effect on the layers containing neoprene, expanding slightly in volume and pressing into firm contact with the surfaces to be joined, any portions of the neoprene containing layers which do not achieve such thorough and intimate contact at the beginning of the bonding operation.

In addition to the above advantages, a precast adhesive in film form is much more convenient to use than the painted-on types of adhesive previously known, as the film type of adhesive can be prepared in advance in such quantities as are desired and can be shipped conveniently and used without the complications which accompany the painting on operation. In addition, the precast film type of adhesive can be manufactured to the desired standards of thickness of the individual layers, and much greater uniformity is thus achieved. The criticality in achieving the correct thickness and uniformity of painted on layers by those applying the adhesive is also eliminated.

Accordingly, it is an object of this invention to provide a precast film type of adhesive which provides bonds of great strength under a wide variety of temperature conditions between various substances, particularly between glass and metal. Another object of the invention is to provide a precast film type adhesive which can be made with considerable uniformity at relatively low cost, and which is very convenient to use. Another object of the invention resides in the provision of assemblies of bonded surfaces utilizing a precast film type of adhesive as referred to herein, which assemblies have greater strength and are not adversely affected by wide variations in temperature conditions encountered in use.

We have found that a film type of adhesive meeting the requirements described above and attaining the objects just referred to can be obtained by depositing a layer of phenolic-neoprene elastomer on a suitable smooth casting surface such as paper coated with polyethylene, followed by the deposition of a layer of an unpolymerized, thermosetting phenolic-synthetic linear polyamide resin composition of the type which becomes liquid during the initial stages of the polymerizing heat treatment, and then by the deposition of another layer of phenolic-neoprene elastomer on the layer of phenolic. The adhesive thus cast can be readily stripped from the casting surface and provides bonds of great strength between a variety of surfaces, particularly between metal and glass. The adhesive cast as just described may be used in a single thickness or in a plurality of thicknesses, depending upon the assembly conditions, as will be described in more detail below.

The polyamides used may of the alcohol soluble type as described in U. S. Patent 2,130,948; including interpolyamides such as that derived from equimolecular amounts of hexamethylene diammonium sebacate. The phenolic used is alcohol soluble and is in the "A" stage. It may be the condensate of 1 mol of phenol with .7–3 mols of formaldehyde.

The phenolic resin and polyamide are combined in a volatile alcohol such as ethyl alcohol in the range of 66⅔%–20% by weight polyamide and 33⅓%–80% by weight phenolic, there being 15%–55% solids by weight in the solution.

The neoprene-phenolic elastomer composition may utilize neoprene (polymerized chloroprene) made as described in U. S. Patent 1,950,436, and the same type of phenolic described above is used, the elastomer comprising 20–50 parts of phenolic in the "A" stage to 100 parts of neoprene, the proportions being by weight. A suitable solvent for the elastomer is one permitting spreading, yet conveniently having a high rate of evaporation, as for example toluene. The solids content of the solution should be about 6–10%.

In the accompanying drawing:

Fig. 1 shows the new type of film adhesive on the casting surface from which it is readily stripped for use; and Fig. 2 shows an assembly wherein an optical prism of glass is attached by means of the adhesive to a metal support.

Referring now to the drawings in greater detail, Fig. 1 shows a casting surface 10 which may be of any suitable material which is smooth and not adversely affected by exposure to the elevated temperatures used for evaporation of the solvent from the neoprene-phenolic and phenolic-polyamide layers to be deposited thereon. We have found a polyethylene surface to be quite suitable for such use. In particular we have used baryta paper melt-coated with polyethylene for this purpose. Surfaces of "Teflon" (polytetrafluoroethylene) or "Kel-F" or "Fluorothene" (trifluorochlorethylene) can also be used.

Reference numeral 11 denotes a layer of neoprene-phenolic elastomer deposited, as will be described in greater detail presently, by elevated temperature evaporation of solvent from a plurality of coatings of neoprene-phenolic elastomer solution applied to the casting surface. In contact with the layer 11 is a layer of unpolymerized thermosetting phenolic-synthetic linear polyamide resin composition 12 which is deposited as a solution in a solvent in a number of coatings and is heat treated to evaporate the solvent in each coating at a temperature below the polymerization temperature. Layer 13 is another layer of neoprene-phenolic elastomer which has been deposited on the layer 12 in a manner similar to the deposition of layer 11.

The three layers forming the cast adhesive are readily stripped from the casting surface 10 when they are to be used, and it is to be understood that the casting surface 10 thus takes no part in the actual bonding operation. These layers are of exaggerated thickness in the drawing for purposes of clarity.

In Fig. 2, there is shown an optical prism 14 bonded to a metal support 15 which may be of cast aluminum, brass, steel or the like, by means of the film type of adhesive shown in Fig. 1. It is to be understood that while we have shown only one thickness of the tri-layer film adhesive in Fig. 2, a plurality of thickness can be used if desired.

Referring now to the actual adhesive casting operation in greater detail, the casting surface 10 is prepared as by melt-coating baryta paper with powdered polyethylene. Obviously a smooth casting surface is highly desirable. With the casting surface thus prepared, a solution of the neoprene-phenolic elastomer in a suitable solvent such as methyl ethyl ketone or toluene is applied in liquid form to the casting surface in a plurality of coatings, each coating being dried at about 140° F. for about 15 to 20 minutes to evaporate most of the solvent from that coating. It is important that the drying temperature be below the softening point of the polyethylene casting surface in order that the adhesive product can be readily stripped from the casting surface. Any convenient number of coatings of the neoprene solution may be deposited on the casting surface but we have found that a layer having a thickness of about 0.005", deposited by the use of five to ten individual coatings, is quite satisfactory and provides an adhesive having the desired properties. After all of the coatings forming the first layer of neoprene-phenolic elastomer have been deposited and individually dried, the casting surface and the entire layer are exposed to the drying conditions for several hours before further treatment.

After the film drying treatment just referred to, a plurality of layers of the unpolymerized phenolic-polyamide solution are applied to the neoprene-phenolic layer to form a layer of phenolic-polyamide having a thickness of about 0.004", this thickness being somewhat critical in obtaining the best bonds. Each coating of phenolic-polyamide is dried for about one to one and one-half hours at around 140° F., and after the desired thickness of the layer has been built up, the entire layer is dried at this temperature over a longer period, preferably for a day or two. The phenolic-polyamide solution may contain any suitable unpolymerized thermosetting phenolic-synthetic polyamide resin combination which provides the desired strength in the polymerized state and which softens substantially to a liquid prior to polymerization upon the application of heat. We have found solutions in ethyl alcohol to be highly satisfactory, but other solvents can be used which do not adversely affect the resin combination or the elastomer and which evaporate in the desired temperature range.

After the phenolic-polyamide layer has been deposited and has received its final drying, another layer of neoprene-phenolic is deposited in the same manner as the first layer. Thus there is provided on the casting surface a three-layer cast adhesive comprising a layer of unpolymerized phenolic-polyamide sandwiched between two layers of neoprene-phenolic.

A neoprene-phenolic solution sold by Narmco, Inc., 600 Victoria Street, Costamesa, California, and known as M3C, is satisfactory for providing the neoprene-phenolic layer, and this same company sells an unpolymerized phenolic-polyamide solution known as N2 which is satisfactory for providing the phenolic-polyamide resin.

In mounting an optical element such as a prism, lens or window on a metal support by the use of adhesive cast as described above, the adhesive is first stripped from the casting surface, on which it has been left until needed for use, and is cut or otherwise formed in the desired configuration, after which it is placed between the two surfaces to be bonded and the entire assembly placed in a suitable fixture which holds the parts in the desired relation and exerts the desired pressure on the parts. The metal support may be, for example, of aluminum or it may be of steel, brass or other metals, and it is obvious that the invention can also be used with other materials, as in bonding glass to glass and metal to metal, etc., if desired.

A single thickness of the three-layer adhesive may be used or a plurality of layers may be desirable in certain applications. This adhesive has the desirable attribute of permitting the use of very low pressures in the bonding operation. However, a wide range of pressures may be used. A pressure as low as 15 p. s. i. provides quite satisfactory results with a single thickness of adhesive, and where two or more layers are used, pressures as low as 3 p. s. i. may be used. The temperatures used in polymerizing the phenolic-polyamide and vulcanizing the neoprene-phenolic layers may be in the range of about 240–340° F., conveniently in the neighborhood of about 270° F. The time required for polymerization of the phenolic-polyamide is about ½ hour after the material reaches a polymerizing temperature of 270° F., but the time will vary according to the temperature, being shorter at higher temperatures and longer at lower temperatures. We have found it convenient to maintain the polymerizing temperature on the entire assembly for about four to five hours to assure thorough heating throughout the entire assembly and the provision of a bond of the desired high strength and uniformity.

The use of this adhesive has the virtue of extreme simplicity, since all that need be done is strip the adhesive from the casting surface, place it between the surfaces to be bonded, and subject the assembly to the desired temperature and pressure conditions. As described above, the phenolic-polyamide softens substantially to a liquid state during the first stages of the heat treatment of the assembly and serves to equalize the pressure throughout the areas of the surface being joined, thus forcing the two Neoprene-containing layers into continuous, intimate contact with the surfaces to be bonded. This function is not found in any other known adhesives of this type, and results in the highly successful bonds of great strength which we are able to achieve. In some cases where glass is being bonded, it is desirable to apply a primer coat of the Neoprene-phenolic solution to the glass element, at least in the area near the surface to be bonded to protect this area so that if any of the liquid phenolic-polyamide is squeezed out from between the two surfaces being bonded during the bonding operation, it will not come into contact with the bare glass.

Thus we have provided a new type of adhesive in a precast film form comprising a layer of unpolymerized phenolic-polyamide sandwiched between two layers of neoprene-phenolic. This adhesive has particular utility in the bonding of glass and metal where flat surfaces are involved, because of the property of the phenolic-polyamide of softening to practically a liquid state before it polymerized to its solid thermoset state. During the period in which the phenolic-polyamide is a liquid, it serves an essential function in forcing the two Neoprene-phenolic layers into intimate and continuous contact with the entire areas of the surfaces to be bonded, and while so holding the Neoprene-phenolic layers, it polymerizes to its set state and the Neoprene-phenolic becomes vulcanized, resulting in a bond of great permanence, strength and resistance to wide variations in temperature between the two surfaces to be bonded.

Our adhesive provides bonds having great strength yet sufficiently thin as to cause separation of the two bonded surfaces by a gap substantially no greater than if they were held only by mechanical clamping means. Only where the most extreme criticality is attached to the positioning of the bonded elements would the thickness of the adhesive, according to our invention, be taken into consideration.

We claim:

1. An adhesive for bonding surfaces of optical glass under pressure and elevated temperature, comprising a precast film made up solely of at least one inner layer of a composition containing A-stage thermosetting phenol-aldehyde resin and a linear polyamide resin sandwiched between outer layers of polymerized chloroprene and phenol-aldehyde elastomer, the said inner layer having the property of softening to substantially a liquid consistency upon heating and before attaining its thermoset state.

2. An adhesive according to claim 1 wherein the said inner layer has a thickness of about 0.004 inch.

3. An adhesive according to claim 1 which is settable at about 240–340° F.

4. An adhesive according to claim 1 wherein each layer is made up of a plurality of individually dried coatings deposited from an organic solvent solution.

5. A method of preparing a cast adhesive in sheet form comprising depositing a coating of an organic solvent solution of polymerized chloroprene and phenol-aldehyde elastomer on a smooth casting surface, drying the coating at elevated temperature to evaporate the solvent, repeating the coating and drying operations until a layer of said polymerized chloroprene and phenol-aldehyde material having a thickness of the order of 0.005 inch is built up, depositing a coating of a composition containing A-stage thermosetting phenol-aldehyde resin and a synthetic linear polyamide resin composition having a thickness of the order of 0.004 inch by deposition from an organic solvent solution and individual drying of a plurality of coatings on the layer of polymerized chloroprene and phenol-aldehyde material, and then depositing another similar layer of polymerized chloroprene and phenol-aldehyde material on the layer of phenolic-aldehyde and polyamide by a similar series of coating deposition and drying operations, whereby there is formed a film of adhesive which is self-supporting and ready for use upon stripping from the casting surface.

6. A process according to claim 5 wherein the solvent evaporation is carried out at about 140° F.

7. An optical assembly having high strength over a wide temperature range and comprising an optical element having a surface bonded to a supporting surface by a precast film of heat and pressure set adhesive comprising at least one inner layer of a thermoset phenol-aldehyde and synthetic linear polyamide resin composition between outer layers of polymerized chloroprene and phenol-aldehyde resin elastomer, said adhesive having great strength yet being sufficiently thin as to cause separation of the two bonded surfaces by a gap substantially no greater than if they were held only by mechanical clamping means.

8. A method of forming an optical assembly comprising placing the surfaces to be bonded in contact with at least one thickness of a precast film of adhesive made up of outer layers of polymerized chloroprene and phenol-aldehyde resin elastomer and at least one inner layer of an unpolymerized, thermosetting phenol-aldehyde and synthetic linear polyamide resin composition, said resin having the property of softening substantially to a liquid state when heated for polymerization purposes, then placing the assembly under pressure and elevated temperature to set the adhesive, said phenol-aldehyde and polyamide layer passing through a substantially liquid stage when heated, but before setting, during which it forces the polymerized chloroprene and phenol-aldehyde resin layers into continuous and intimate contact with the surfaces being bonded.

9. A method according to claim 8 wherein one thickness of a three-layer cast adhesive is used between the surfaces being bonded, the bonding pressure being about 15 p. s. i. and the bonding temperature being about 240–340° F.

10. A method according to claim 9 wherein the heat and pressure are maintained for about 4–5 hours.

11. A method according to claim 8 wherein a plurality of layers of the adhesive are used and a bonding pressure as low as 3 p. s. i. is used, the bonding temperature being about 240–340° F.

References Cited in the file of this patent

UNITED STATES PATENTS

| Number | Name | Date |
|---|---|---|
| 2,191,367 | Carothers | Feb. 20, 1940 |
| 2,271,233 | Smith et al. | Jan. 27, 1942 |
| 2,499,134 | De Bruyne | Feb. 28, 1950 |
| 2,558,244 | Gibbons | June 26, 1951 |
| 2,575,265 | Fiedler et al. | Nov. 13, 1951 |